United States Patent [19]
Bowers et al.

[11] Patent Number: 6,008,645
[45] Date of Patent: Dec. 28, 1999

[54] PREDICTION OF PERMEABILITY FROM CAPILLARY PRESSURE CURVES DERIVED FROM NUCLEAR MAGNETIC RESONANCE PORE SIZE DISTRIBUTIONS

[75] Inventors: Mark C. Bowers; Andre' J. Bouchard, both of Houston; Tommy V. Ragland; Gary D. Myers, both of Katy, all of Tex.

[73] Assignee: Conoco Inc., Ponca City, Okla.

[21] Appl. No.: 08/815,343

[22] Filed: Mar. 11, 1997

[51] Int. Cl.[6] .................................................. G01V 3/00
[52] U.S. Cl. .......................... 324/303; 324/366; 324/362; 250/253
[58] Field of Search .................................. 324/303, 366, 324/362, 373; 250/253, 256

[56] References Cited

U.S. PATENT DOCUMENTS 5,838,155  11/1998  Bowers ..................................... 324/303

OTHER PUBLICATIONS

Kenyon, W. E. et al., "Pore–Size Distribution and NMR in Microporous Cherty Sandstones" in Transactions SPWLA 30th Annual Logging Symposium, Denver, CO, Jun. 11–14, 1989, Paper LL, pp. 1–24.

Prammer, M. G., "NMR Pore Size Distributions and Permeability At the Well Site" in Transactions 69th Annual Technical and Exhibition of the Society of Petroleum Engineers, New Orleans, LA, Sep. 25–28, 1994, SPE Paper 28368, pp. 55–64.

Swanson, B.F., A Simple Correlation Between Permeabilities and Capillary Pressures: Journal of Petroleum Technology, Dec., 1981, pp. 2498–2503.

Thomeer, J. H. M., "Introduction of a Pore Geometrical Factor Defined by the Capillary Pressure Curve", Petroleum Transactions of the AIME, Mar., 1960, pp. 73–77; and.

Timur, A., "Pulsed Nuclear Magnetic Resonance Studies of Porosity, Movable Fluid, and Permeability of Sandstones", Journal of Petroleum Technology, Jun., 1969, pp. 775–786.

*Primary Examiner*—Christine K. Oda
*Assistant Examiner*—Brij B. Shrivastav

[57] ABSTRACT

Capillary pressure curves can be derived from nuclear magnetic resonance (NMR) pore size distributions. These derived capillary pressure curves can be used to derive the displacement pressure, the fractional bulk volume of mercury at infinite pressure and a geometrical factor. These factors can be used to accurately predict permeability from an NMR derived capillary pressure curve.

7 Claims, 1 Drawing Sheet

PREDICTION OF PERMEABILITY FROM CAPILLARY PRESSURE CURVES DERIVED FROM NUCLEAR MAGNETIC RESONANCE PORE SIZE DISTRIBUTIONS

FIELD OF INVENTION

The present invention relates to a system to efficiently and accurately predict permeability from capillary pressure curves derived from nuclear magnetic resonance pore size distributions.

BACKGROUND

The oil industry has long been interested in fluid flow properties of porous media. An article by A. Timur entitled "Pulsed Nuclear Magnetic Resonance Studies of Sandstones" in the Journal of Petroleum Technology, June 1969, illustrated that nuclear magnetic resonance measurements could be used to derive fluid flow properties of porous media.

Nuclei with a odd number of protons, like hydrogen nuclei, become aligned parallel to a static magnetic field. These aligned nuclei result in a net magnetic moment parallel to the direction of the static magnetic field, similar to a small dipole magnet aligned with the earth's magnetic field. That condition is the lowest energy state of the system.

An external force, in the form of a radio frequency pulse at the Larmor frequency, can perturb the system to a higher energy state. The result is that the net magnetic moment is reoriented. After removal of the radio frequency pulse, the nuclei return to the lowest energy state through relaxation processes. Relaxation process have been described in a book by T. C. Farrar and E. D. Becker entitled "Pulse and Fourier Transform NMR Introduction to Theory and Methods", 1971 Academic Press, New York, p. 458 and a book by J. C. Davis entitled "Advanced Physical Chemistry", 1965, The Ronald Press Company, New York, p. 577.

Relaxation is governed by molecular dynamics. In liquids, relaxation is controlled by the size and interactions of the molecules. Water and oil have different relaxation characteristics and different crude oils have different relaxation characteristics because of compositional variation. In porous media, saturated with a fluid, relaxation is complex. Molecules near the solid surface can interact with that surface which enhances the relaxation rate. The relaxation rate is proportional to the surface area-to-volume ratio of the pores. The constant of proportionality, termed the surface relaxivity, describes the relaxation provoking power of the surface.

Two time constants are derived from nuclear magnetic resonance measurements. The longitudinal or spin-lattice relaxation time ($T_1$) refers to a rate constant that characterizes the return of the net magnetization parallel to the static magnetic field. The transverse or spin-spin relaxation time ($T_2$) refers to a rate constant that characterizes the decay rate of magnetization in an X-Y plane.

Nuclear magnetic resonance measurements can be made with laboratory spectrometers and well logging sondes. These instruments are designed to detect the change in magnetization as a function of time. That data is then used to derive the relaxation rate constants. For any instrument configuration, the apparatus will only respond to nuclei within a defined volume. Different nuclei are sensed because each type of nucleus can only be reoriented by a radio frequency pulse with a certain frequency. For the hydrogen nuclei, that frequency is 42.5759 MHZ/Tesla.

$T_2$ measurements are the most commonly used NMR measurement in well logging and for petrophysical applications. They are less time consuming than $T_1$ measurements and can be made with a moving well logging sonde. A paper by W. E. Kenyon et al., entitled "Pore Size Distributions and NMR in Microporous cherty Sandstones" in Transactions SPWLA 30th Annual Logging Symposium, Jun. 11–14, 1989, Paper LL, illustrated how nuclear magnetic resonance data could be transformed into volume-to-surface area distributions of the pores contained within a porous media. A second paper by M. G. Prammer entitled "NMR Pore Size Distributions and Permeability At the Well Site" in Transactions 69th Annual Technical and Exhibition of the Society of Petroleum Engineers, Sep. 25–28, 1994, Paper 28368, illustrated another method for deriving volume-to-surface area distributions from nuclear magnetic resonance data.

These volume-to-surface area distributions approximate the pore size distribution of a porous media. The pore size distribution can be transformed to a capillary pressure curve for the equivalent porous microstructure and used to estimate permeability.

SUMMARY OF INVENTION

The method of the present invention provides an improved method for the prediction of permeability of a porous media. The method is based upon the transformation of a pore size distribution derived from Nuclear Magnetic Resonance (NMR) into a representative capillary pressure curve. The transformation of an NMR pore size distribution to a capillary pressure distribution is done through a simple calibration process. The displacement pressure, bulk volume of the non-wetting phase at infinite pressure and geometrical factor which is related to the shape of the capillary pressure curve are determined. These factors are directly related to permeability and are then used to calculate permeability. The present invention can be used to derive the permeability of porous media with NMR well logging sondes and laboratory spectrometers.

DETAILED DESCRIPTION OF THE PREFERRED EMBODIMENT

Figure 1:
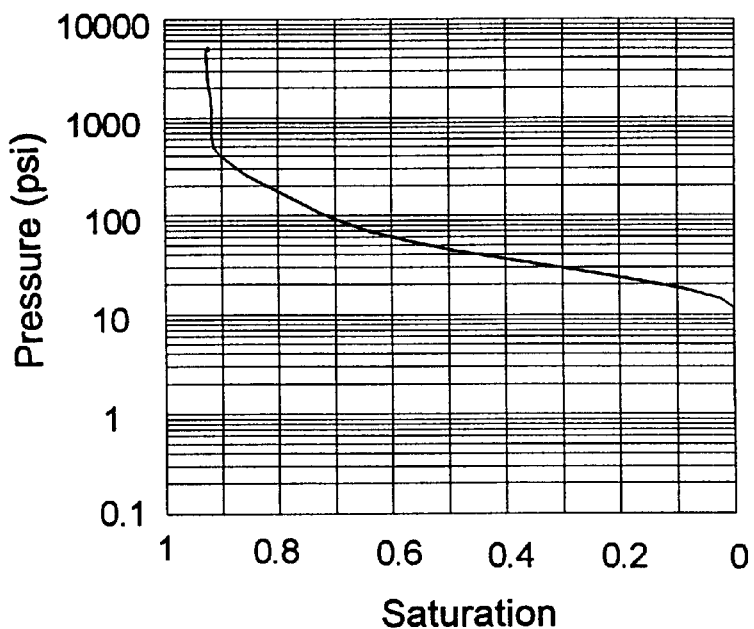
FIG. 1 is an illustration of an NMR derived capillary pressure curve corrected for the irreducible water saturation and the measured capillary pressure.

Much of the interest in nuclear magnetic resonance (NMR) applications related to the petroleum industry comes from empirical models used to predict permeability. These equations have the general form:

$$K = c[T_n^2 \phi^4]^x$$

where: K=permeability (millidarcys)
 c=constant
 $T_n$=longitudinal ($T_1$) or transverse ($T_2$) relaxation time
 $\Phi$=porosity
 x=exponent The major problem associated with these models is that they are dominated by porosity and therefore only work on data sets with strong porosity-permeability relationships.

However, even on these data sets the correct magnitude of permeability is rarely predicted. The best method of predicting permeability is based on the use of capillary pressure curves. These curves incorporate information about how the pores are interconnected by the pore throats and the size of those throats.

$T_2$ pore size distributions can be derived from laboratory spectrometers or well logging sondes. In most clastic and many carbonate rocks, there is a relationship between pore size and throat size in that big pores generally have big throats and small pores have small throats. Because of that general relationship in these particular rocks, an adequate estimate of the capillary pressure curve can be made from pore body size information derived from NMR.

The relationship between $T_2$ and the surface area-to-volume ratio or pore size is:

$$\frac{1}{T_2} = \rho_2 \frac{S}{V} \quad (1)$$

where: $\rho_2$=surface relativity associated with $T_2$ measurements

S/V=surface area-to-volume ratio or pore size

The surface relativity associated with $T_2$ measurements can be determined from a number of methods used to derive the surface area-to-volume ratio of porous materials or area-to-perimeter ratio of the pores as viewed in cross section from thin slabs of the porous material. The most common methods include pulsed field gradient NMR measurements, capillary pressure measurements, gas adsorption or thin sections of the porous material.

The porous microstructure of a rock can be represented as a bundle of cylindrical tubes where the diameter of the tube is equal to the mean throat size associated with all of pores of a given size. Therefore, Eq. 1 becomes:

$$\frac{1}{T_2} = \rho_2 \frac{2}{r} \quad (2)$$

Eq. 2 can be rewritten as:

$$r/2 = \rho_2 T_2 \quad (3)$$

The Laplace Equation for determining capillary pressure ($P_c$) is:

$$P_c = \frac{2\gamma \cos\theta}{r} \quad (4)$$

where: r=throat radius
γ=interfacial tension
θ=contact angle

In a capillary pressure measurement, pressure, interfacial tension and contact angle are known and throat radius can be calculated for any pressure.

Capillary pressure is determined through capillary pressure experiments. These experiments are made using a number of techniques such as mercury injection experiments, porous plate experiments and centrifuge experiments. Each of these methods involves the measurement of the volume of the non-wetting phase forced into the porous material as a function of pressure. As pressure is increased, the non-wetting phase can be forced into smaller and smaller openings. In rocks, these openings are the pore throats, or the openings between pores, and capillary pressure measurements are used to determine throat size. As the throats get smaller, greater amounts of pressure are needed to force the non-wetting phase through the throats.

Therefore, a capillary pressure curve can be used to determine the size of the throats associated with rocks. The capillary pressure curve is used to derive a throat size distribution.

By solving Eq. 4 for r and substituting into Eq. 3:

$$\rho_2 T_2 = \frac{-\gamma \cos\theta}{P_c} \quad (5)$$

By rearranging:

$$T_2 P_c = \frac{-\gamma \cos\theta}{\rho_2} \quad (6)$$

In Eq. 6, $\rho_2$ represents the enhancement of relaxation caused by the grain surfaces (or pore walls) and must incorporate a pore size to throat size scaling factor. The value of $\rho_2$ must incorporate a pore size to throat size scaling factor as NMR is a measurement of pores size and capillary pressure is a measure of throat size. In rocks, the pore throats are smaller than the pores. Let $\rho_{2tr}$ represent the surface relaxivity as well as the factor scaling pore size to throat size. Eq.6 is rewritten as:

$$T_2 P_c = \frac{-\gamma \cos\theta}{\rho_{2tr}} \quad (7)$$

Additional simplifications can be made by letting $\rho_c$ be defined as:

$$\rho_c = \frac{-\gamma \cos\theta}{\rho_{2tr}} \quad (8)$$

Through substitution, Eq. 7 becomes:

$$T_2 P_c = \rho_c \quad (9)$$

Preferably $\rho_c$ is calculated through calibration where the pore size distribution derived from NMR is matched to the throat size distribution from measured samples of capillary pressure (herein measured capillary pressure) using Eq. 9. The calibration is done by determining the $T_2$ value associated with the largest amplitude from the pore size distribution and the $P_c$ value associated with the largest saturation value from the throat size distribution. These two values are substituted in Eq. 9 to calculate $\rho_c$. However, adequate estimates of $\rho_c$ are often possible if calibration data is not available.

Once $\rho_c$ is calculated, or estimated, all of the $T_2$ times can be converted to pressure. The pressure equivalent for each value of $T_2$ is defined by the following:

$$P_{ci} = \frac{\rho_c}{T_{2i}} \quad (10)$$

where: $P_{ci}$=the pressure equivalent of $T_{2i}$
$T_{2i}$=each $T_2$ value from the pore size distribution As the $T_2$ times are now converted to a pressure, the proportion of porosity associated with these $T_2$ times, now pressures, are equivalent to the saturation at that pressure.

Therefore, the NMR pore size distribution can be converted to a throat size distribution similar to that derived from capillary pressure.

Often only a limited number of measured capillary pressures are made. These measurements are derived from core which is expensive to obtain and therefore a limited number of samples and capillary pressure measurements are made. The purpose of the method of the present invention is to utilize this limited amount of measured capillary pressure data in conjunction with NMR data which is more readily obtainable, for determining predicted pressure curves wherever NMR data has been collected within the same underground formation. Once the predicted capillary pressure curves are determined for a formation, permeability can likewise be predicted.

The NMR throat size distribution can be converted to a predicted capillary pressure curve as follows: First, the throat size distribution is transformed into a cumulative frequency distribution. That transformation is accomplished by the summation of the amount of porosity at each converted pressure. A plot of the sum of porosity at each pressure is the throat size distribution. However, that distribution must be corrected for the irreducible water saturation.

The irreducible water saturation ($S_{wi}$) is the amount of the water that cannot be displaced by the non-wetting phase at any pressure. $S_{wi}$ can be determined from NMR with the following equation:

$$S_{wi} = \frac{1 - FFI}{\phi}$$

where: FFI=the free fluid index

Φ=porosity

FFI is determined from the NMR relaxation data. A time cut off is applied to the NMR relaxation data and all pores associated with fluids that are moveable. The total amount of porosity associated with those moveable fluids is FFI. That correction is important and needed to match the $S_{wi}$ value derived from measured capillary pressure. Choosing the correct cut off time is relatively simple and is typically around 30 milliseconds for sandstones and carbonates but can vary from 16 to 90 milliseconds.

As previously discussed, the use of empirical equations to predict permeability is inadequate. A better, and more universal approach, would be to develop a methodology that is not directly dependent upon porosity, $T_1$ or $T_2$. Presently, the only other piece of information available from NMR is the pore size distribution. As previously shown, the pore size distribution can be transformed into a capillary pressure curve.

A capillary pressure curve contains information about the amount of porosity associated with a given throat size. Because the magnitude of permeability is controlled by pore throats, a capillary pressure curve can be used to predict permeability. The problem in using capillary pressure is that a quantitative description of the curve is difficult to obtain. J. H. M. Thomeer published a paper entitled "Introduction Of A Pore Geometrical Factor Defined By Capillary Pressure" in Petroleum Transactions of the AIME, March 1960, p. 73 where he illustrated that a capillary pressure curve could be approximated by a hyperbola and that small deviations from that hyperbola were not important.

The shape of the curve and its position, relative to a coordinate system defined by the pressure and saturation is given by:

$$\frac{(V_b)_{P_c}}{(V_b)_{P_\infty}} = e^{-\frac{G}{\log \frac{P_c}{P_d}}} \tag{11}$$

where:

$(V_b)_{PC}$=fractional bulk volume occupied by the non-wetting phase at pressure $P_C$ $(V_b)_{P\infty}$=fractional bulk volume occupied by the non-wetting phase at infinite pressure G=pore geometrical factor $P_d$=displacement pressure The value of $(V_b)_{P\infty}$ represents the total interconnected volume and for some samples approaches the total porosity of the system. $P_d$ represents the pressure where mercury first enters the porous microstructure of the sample.

The known parameters are $(V_b)_{P_c}$ and $P_c$ while the unknowns are $(V_b)_{P\infty}$, G and $P_d$. The unknowns are determined mathematically by nonlinear optimization where the differences between the predicted data and actual measured data are minimized. When the differences between actual and minimized values are obtained, the values used for $(V_b)_{P\infty}$, G and $P_d$ are considered known. For predicting permeability, the NMR derived capillary pressure (predicted capillary pressure) data is used as the actual data.

Thomeer (1960) found that permeability was strongly correlated to the ratio of $(V_b)_{P\infty}/P_d$, for families of curves with similar G values. Later, B. F. Swanson in a paper entitled "A Simple Correlation Between Permeabilities and Mercury Capillary Pressure" in Journal of Petroleum Technology, December 1981, page 2498, presented a set of equations to predict permeability from capillary pressure data. These equations can be rewritten in terms of the parameters developed by Thomeer (1960). For sandstones and carbonates the equation is:

$$K = C \left[ 10^{-2\sqrt{\frac{G}{2.303}}} \left( \frac{(V_b)_{P\infty}}{P_d} \right) \right]^n \tag{12}$$

where: K=permeability in millidarcys

C=constant n=constant

The applicability of these equations were first tested using Eq. 12 on samples on which mercury capillary pressure curves were compiled(n=82). The predicted permeability derived from measured capillary pressure compares favorably with measured permeability for these samples. Therefore, accurate predictions of permeability produced from NMR derived capillary pressure curves are possible.

The derivation of permeability from NMR derived capillary pressure was tested on twenty samples on which NMR measurements were made and pore size distributions derived and actual permeability measurements were made. These rocks contain different types of clay in various abundances and have a large range of permeability values.

Figure 2:
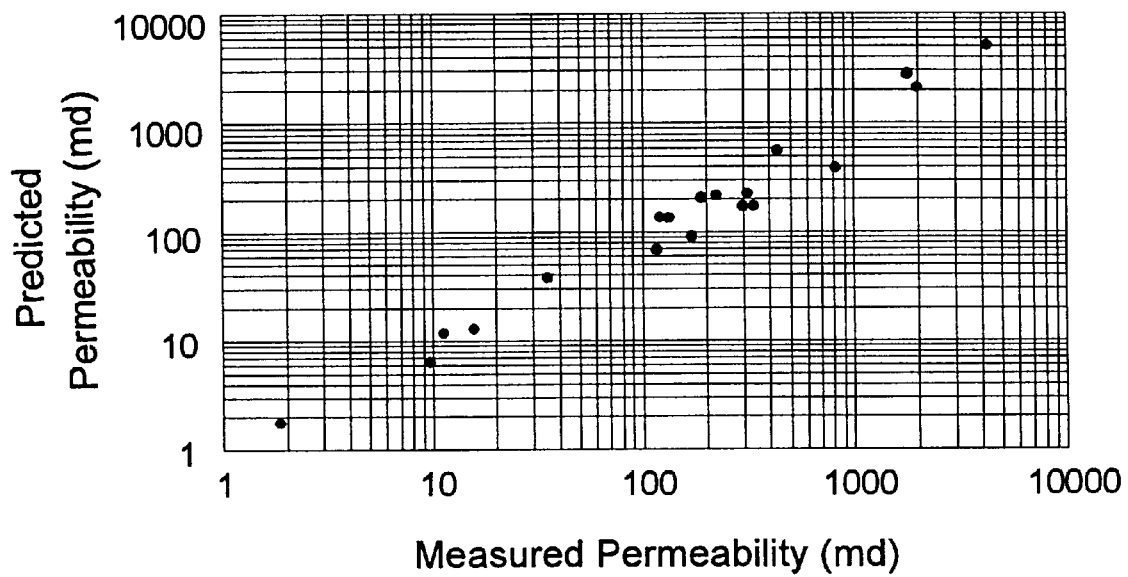
FIG. 2 is an illustration of predicted permeability from an NMR derived capillary pressure using Eq. 12 and measured permeability.

FIG. 2 is an illustration of the relationship between the predicted permeability from NMR derived capillary pressure curves and measured permeability. Permeability was calculated using Eq. 12. The correlation coefficient is 0.99 and the mean ratio of measured permeability to predicted permeability is 1.25 with a standard deviation of 0.44. Therefore, 66% of the samples are within the range of 0.88 to 1.69 times the permeability.

A similar comparison was made using Eq. 13. The correlation coefficient is 0.99 with a mean predicted to measured permeability ratio of 1.5. The standard deviation of that ratio is 1.7.

The constants C and n from Equation 12 can be determined through the use of a calibration data set of cores and capillary pressure data. A plot of measured permeability versus the quantity:

$$\left[10^{-2\sqrt{\frac{G}{2.303}\left(\frac{(V_b)P_\infty}{P_d}\right)}}\right]$$

Hereafter, that quantity will be referred to as the kernel.

The coefficients C and n should be adjusted to minimize the error in the prediction of K. The estimation of C and n can be accomplished by fitting the data with an equation having the form of:

$$y = C(x)^n$$

where: y=values associated with the permeability
x=values associated with the kernel The constants C and n are determined through least squares minimization or other suitable error minimization technique.

The example presented here uses $T_2$ relaxation data. The methodology could be modified for $T_1$ measurements and would include the substitution of $T_1$ for $T_2$ in Eqs. 2–10 and the substitution of $\rho_1$ for $\rho_2$ in the same set of equations. The presented method is applicable to data derived from a laboratory NMR spectrometer and well logging with an NMR sonde. The presented methodology is also applicable to NMR data generated in a constant magnetic field gradient or gradient magnetic field.

Although the present invention has been described in connection with the preferred embodiment, it is not intended to be limited to the specific form set forth herein, but on the contrary, it is intended to cover such modifications, alternatives, and equivalents as can be reasonably included in the spirit and scope of the invention by the appended claims.

We claim:

1. A method for determining a predicted capillary pressure curve based on NMR data on rocks in an underground formation where the rocks are composed of pores and connecting throats, comprising the steps of;

measuring capillary pressure points and saturation values from a core sample to generate a capillary pressure curve;

convert the measured capillary pressure points and saturation values to a throat size distribution for said core sample;

measure NMR relaxation from said core sample and convert the NMR relaxation measurement to a pore size distribution for said core sample;

determine the largest $T_2$ value associated with the largest amplitude from said pore size distribution;

determine the capillary pressure associated with the largest saturation value from said throat size distribution;

using $T_2$ and capillary pressure to determine a value for the surface relaxivity $\rho_c$ for said core sample;

using $\rho_c$ to convert $T_2$ times to pressure equivalents which represent data points on an NMR throat size distribution; and converting said NMR throat size distribution to a cumulative frequency distribution of throat size that represents a predicted capillary pressure curve.

2. The method of claim 1 and further including the determination of the irreducible water saturation ($S_{wi}$) from NMR measurements and using that value to correct the NMR predicted capillary pressure curve for irreducible water saturation.

3. The method of claim 1 and further including the determination of NMR pore size distributions from NMR open hole logging tools; and using $P_c$, generating predicted capillary pressure curves using pore size distributions from NMR measurements made with open hole logging tools.

4. A method for accurately determining the permeability to water of rocks from an underground reservoir from an NMR derived capillary pressure curve, comprising:

(a) providing $T_2$ relaxation curves derived from NMR measurements of a formation material from a laboratory spectrometer or logging sonde;

(b) determining the fractional bulk volume occupied by a non-wetting phase in the formation material at pressure $P_c$ and at infinite pressure $(V_b)_{P_\infty}$ mathematically by nonlinear optimization techniques;

(c) determining a geometrical factor G and a displacement pressure $P_d$ associated with an NMR derived capillary pressure curve mathematically determined by nonlinear optimization techniques; and (d) using the parameters calculated in (b) and (c) in empirically derived equations to predict permeability.

5. The method of claim 4 and further including the determination of capillary pressure curves from NMR logging tools using the calibration from NMR measurements on cores and capillary pressure data from cores to derive an NMR derived capillary pressure curve for determining permeability.

6. The method of claims 4 or 5 and further including the derivation of the empirically derived equations to predict permeability from NMR derived capillary pressure curves comprising:

(a) providing measurements of permeability K, on core samples;

(b) providing measurements of the geometrical factor G, the fractional bulk volume occupied by the non-wetting phase at infinite pressure $(V_b)_{P_\infty}$, and the displacement pressure $P_d$ from measured capillary pressure curves on core samples and using said parameters in the calculation of the quantity $$\left[10^{-2\sqrt{\frac{G}{2.303}\frac{(V_b)P_\infty}{P_d}}}\right]$$

hereafter referred to as the kernel;

(c) determining the coefficients of C and n by use of a suitable minimization technique;

(d) using C and n in the equation $$K = C\left[10^{-2\sqrt{\frac{G}{2.303}\frac{(V_b)P_\infty}{P_d}}}\right]^n$$

for determining permeability from NMR derived capillary pressure curves.

7. The method of claim 6 where minimizing the error is accomplished by least squares minimization with the equation $$y = C(x)^n$$

where x is the kernel and y is permeability.

* * * * *

UNITED STATES PATENT AND TRADEMARK OFFICE
CERTIFICATE OF CORRECTION

PATENT NO.: 6,008,645

DATED: December 28, 1999

INVENTOR(S): Mark C. Bowers, André J. Bouchard, Tommy V. Ragland, and Gary D. Myers It is certified that error appears in the above-identified patent and that said Letters Patent is hereby corrected as shown below:

Column 3, line 18, "relativity" should be --relaxivity--.

Column 3, line 21, "relativity" should be --relaxivity--

Signed and Sealed this

Twenty-fifth Day of July, 2000

Attest:

Attesting Officer

Q. TODD DICKINSON

Director of Patents and Trademarks